US011638173B2

(12) United States Patent
Ozturk et al.

(10) Patent No.: US 11,638,173 B2
(45) Date of Patent: *Apr. 25, 2023

(54) CHANNEL ACCESS PRIORITY FOR NR-U DATA BEARERS

(71) Applicant: QUALCOMM INCORPORATED, San Diego, CA (US)

(72) Inventors: Ozcan Ozturk, San Diego, CA (US); Xiaoxia Zhang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/695,199

(22) Filed: Mar. 15, 2022

(65) Prior Publication Data

US 2022/0210689 A1  Jun. 30, 2022

Related U.S. Application Data

(63) Continuation of application No. 16/947,835, filed on Aug. 19, 2020, now Pat. No. 11,304,086.

(Continued)

(51) Int. Cl.
G06F 11/00 (2006.01)
H04W 28/02 (2009.01)
H04W 72/56 (2023.01)

(52) U.S. Cl.
CPC ....... H04W 28/0268 (2013.01); H04W 72/56 (2023.01)

(58) Field of Classification Search
CPC ............ H04W 28/0268; H04W 72/10; H04W 28/0263; H04W 76/15; H04W 74/0808; H04W 28/24

(Continued)

(56) References Cited

U.S. PATENT DOCUMENTS 11,115,855 B2   9/2021  Yi
11,304,086 B2 * 4/2022  Ozturk ............. H04W 28/0268
(Continued)

FOREIGN PATENT DOCUMENTS

EP      3435700 A1    1/2019
WO   2018174521 A1    9/2018

OTHER PUBLICATIONS

Ericsson: "Discussions on Channel Access Priority in NR-U", 3GPP Draft, 3GPP TSG-RAN WG2 #106, Tdoc R2-1907582 (Revision of R2-1904744), 3rd Generation Partnership Project (3GPP), Mobile Competence Centre, 650, Route Des Lucioles, F-06921 Sophia-Antipolis Cedex, France, vol. RAN WG2, No. Reno, US, May 13, 2019-May 17, 2019 May 13, 2019 (May 13, 2019), XP051731018, 4 Pgs, Retrieved from URL:http://www.3gpp.org/ftp/Meetings%5F3GPP%5FSYNC/RAN2/Docs/R2%2D1907582%2Ezip. [retrieved May 13, 2019] p. 1, para. 2-p. 3, para. 2 Table on p. 3.

(Continued)

Primary Examiner — Chuong T Ho
(74) Attorney, Agent, or Firm — Haynes and Boone, LLP

(57) ABSTRACT

Wireless communication devices, systems, and methods related to mechanisms to aid a user equipment in determining the channel access priority (CAPC) to use for a data radio bearer (DRB) on the response link, such as uplink (UL), that includes multiple quality of service (QoS) flows for an UL transmission (such as for a configured grant UL transmission). The UE may receive a plurality of QoS flows in a common DRB from a base station. The UE may apply a rule to select a CAPC to apply for all QoS flows in the common DRB on an UL transmission. This rule may alternatively include the base station making the selection of the CAPC to apply and informing the UE of the selected CAPC for implementation. The UE may then apply the selected CAPC to the UL transmission.

30 Claims, 8 Drawing Sheets

Related U.S. Application Data

(60) Provisional application No. 62/891,091, filed on Aug. 23, 2019.

(58) Field of Classification Search
USPC .............................................. 370/235, 235.1
See application file for complete search history.

(56) References Cited

U.S. PATENT DOCUMENTS

| | | |
|---|---|---|
| 2017/0150363 A1 | 5/2017 | Tenny |
| 2017/0238342 A1 | 8/2017 | Yang |
| 2019/0174573 A1 | 6/2019 | Velev |
| 2019/0246310 A1 | 8/2019 | Han |
| 2020/0100285 A1 | 3/2020 | Roy |
| 2020/0146064 A1 | 5/2020 | Jeon |
| 2020/0280872 A1 | 9/2020 | Fiorani |
| 2020/0314895 A1 | 10/2020 | Bergstrom |
| 2021/0235512 A1 | 7/2021 | Lee |
| 2022/0183049 A1* | 6/2022 | Lee ................. H04W 74/006 |

OTHER PUBLICATIONS

International Search Report and the Written Opinion of the International Search Authority issued in Application No. PCT/US2020/047267, dated Nov. 17, 2021 (18 pgs).

ZTE Corporation, et al., "UL Data Multiplexing and Channel Access Priority for NR-U", 3GPP Draft, 3GPP TSG RAN WG2 NR #106 Meeting, R2-1906311 UL Data Multiplexing and Channel Access Priority for NR-U, 3GPP, Mobile Competence Centre, 650, Route Des Lucioles, F-06921 Sophia-Antipol, vol. RAN WG2, No. Reno, USA, May 13, 2019-May 17, 2019 May 13, 2019 (May 13, 2019), XP051729778, 4 Pgs, Retrieved from URL:http://www.3gpp.org/ftp/Meetings%5F3GPP%5FSYNC/RAN2/Docs/R2%2D1906311%2Ezip [retrieved May 13, 2019] p. 1, para. 2-p. 3, para. 2 table 2.

* cited by examiner

| Channel Access Priority Class (p) | 5QI |
|---|---|
| 1 | 1, 3, 5, 65, 66, 67, 69, 70, 79, 80, 82, 83, 84, |
| 2 | 2, 7, 71 |
| 3 | 4, 6, 8, 9, 72, 73, 74, 76 |
| 4 | - |

CHANNEL ACCESS PRIORITY FOR NR-U DATA BEARERS

CROSS REFERENCE TO RELATED APPLICATIONS

This application is a continuation of U.S. application Ser. No. 16/947,835, filed Aug. 19, 2020, which claims priority to and the benefit of U.S. Provisional Patent Application No. 62/891,091, filed Aug. 23, 2019, both of which are hereby incorporated by reference in their entirety as if fully set forth below in their entirety and for all applicable purposes.

TECHNICAL FIELD

This application relates to wireless communication systems, and more particularly to methods (and associated devices and systems) for determining the channel access priority (CAPC) to use for a data radio bearer (DRB) that includes multiple quality of service (QoS) flows.

INTRODUCTION

Wireless communications systems are widely deployed to provide various types of communication content such as voice, video, packet data, messaging, broadcast, and so on. These systems may be capable of supporting communication with multiple users by sharing available system resources. A wireless multiple-access communications system may include a number of base stations (BSs), each simultaneously supporting communications for multiple communication devices, which may be otherwise known as user equipment (UE).

The channel access priority for a QoS flow may be determined by the QoS flow's QoS identifier (also referred to as "5G QoS identifier" or 5QI) based on a mapping. When a UE transmits data on uplink (e.g., on a configured grant), the UE multiplexes data from logical channels (LCH) depending on their priority into a medium access control (MAC) protocol data unit (PDU). The access priority (also referred to as "Channel Access Priority" or CAPC) of a MAC PDU may be the lowest access priority among all the logical channels in the MAC PDU when it is transmitted on a configured grant. This priority determines parameters to be used in performing Listen-Before-Talk (LBT) before transmitting on the configured grant.

However, problems arise when multiple QoS flows are permitted on a given data radio bearer (DRB), instead of being restricted to a one-to-one mapping. For example, with a many-to-one mapping possible (i.e., multiple QoS flows to one DRB), the UE may not know what CAPC to use for the DRB on the uplink. Thus, there is a need to provide UEs with the ability to determine the CAPC to use for a DRB which includes multiple QoS flows with potentially different CAPCs.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes receiving, by a user equipment (UE) from a base station (BS), a plurality of downlink data packets comprising a corresponding plurality of quality of service flows (QoS flows), each the plurality of QoS flows being mapped to a common data radio bearer (DRB). The method further includes selecting, by the UE, a channel access priority class (CAPC) for the common DRB for transmitting an UL data packet based on a rule applied to the plurality of QoS flows mapped to the common DRB. The method further includes transmitting, by the UE to the BS, the uplink data packet with the selected CAPC.

In an additional aspect of the disclosure, a method of wireless communication includes mapping, by a base station (BS), a plurality of downlink data packets comprising a corresponding plurality of quality of service flows (QoS flows) to a common data radio bearer (DRB). The method further includes transmitting, by the BS to a user equipment (UE), the plurality of downlink data packets on the common DRB. The method further includes receiving, by the BS from the UE, an uplink (UL) data packet on the common DRB having a channel access priority class (CAPC) selected based on a rule applied to the plurality of QoS flows mapped to the common DRB.

In an additional aspect of the disclosure, a user equipment includes a transceiver configured to receive, from a base station (BS), a plurality of downlink data packets comprising a corresponding plurality of quality of service flows (QoS flows), each the plurality of QoS flows being mapped to a common data radio bearer (DRB). The user equipment further includes a processor configured to select a channel access priority class (CAPC) for the common DRB for transmitting an UL data packet based on a rule applied to the plurality of QoS flows mapped to the common DRB. The user equipment further includes wherein the transceiver is further configured to transmit, to the BS, the uplink data packet with the selected CAPC.

In an additional aspect of the disclosure, a base station includes a processor configured to map a plurality of downlink data packets comprising a corresponding plurality of quality of service flows (QoS flows) to a common data radio bearer (DRB). The base station further includes a transceiver configured to transmit, to a user equipment (UE), the plurality of downlink data packets on the common DRB, and receive, from the UE, an uplink (UL) data packet on the common DRB having a channel access priority class (CAPC) selected based on a rule applied to the plurality of QoS flows mapped to the common DRB.

In an additional aspect of the disclosure, a non-transitory computer-readable medium is provided having program code recorded thereon, the program code comprising code for causing a user equipment (UE) to receive, from a base station (BS), a plurality of downlink data packets comprising a corresponding plurality of quality of service flows (QoS flows), each the plurality of QoS flows being mapped to a common data radio bearer (DRB). The program code further comprises code for causing the UE to select a channel access priority class (CAPC) for the common DRB for transmitting an UL data packet based on a rule applied to the plurality of QoS flows mapped to the common DRB. The program code further comprises code for causing the UE to transmit, to the BS, the uplink data packet with the selected CAPC.

In an additional aspect of the disclosure, a non-transitory computer-readable medium is provided having program code recorded thereon, the program code comprising code for causing a base station (BS) to map a plurality of downlink data packets comprising a corresponding plurality of quality of service flows (QoS flows) to a common data radio bearer (DRB). The program code further comprises code for causing the BS to transmit, to a user equipment (UE), the plurality of downlink data packets on the common DRB. The program code further comprises code for causing the BS to receive, from the UE, an uplink (UL) data packet on the common DRB having a channel access priority class (CAPC) selected based on a rule applied to the plurality of QoS flows mapped to the common DRB.

In an additional aspect of the disclosure, a user equipment includes means for receiving, by the user equipment (UE) from a base station (BS), a plurality of downlink data packets comprising a corresponding plurality of quality of service flows (QoS flows), each the plurality of QoS flows being mapped to a common data radio bearer (DRB). The user equipment further comprises means for selecting a channel access priority class (CAPC) for the common DRB for transmitting an UL data packet based on a rule applied to the plurality of QoS flows mapped to the common DRB. The program code further comprises means for transmitting, to the BS, the uplink data packet with the selected CAPC.

In an additional aspect of the disclosure, a base station includes means for mapping, by the base station (BS), a plurality of downlink data packets comprising a corresponding plurality of quality of service flows (QoS flows) to a common data radio bearer (DRB). The base station further includes means for transmitting, to a user equipment (UE), the plurality of downlink data packets on the common DRB. The program code further includes means for receiving, from the UE, an uplink (UL) data packet on the common DRB having a channel access priority class (CAPC) selected based on a rule applied to the plurality of QoS flows mapped to the common DRB.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments, it should be understood that such exemplary embodiments can be implemented in various devices, systems, and methods.

BRIEF DESCRIPTION OF THE DRAWINGS

FIG. 6 illustrates a table format for a mapping relationship according to some embodiments of the present disclosure.

DETAILED DESCRIPTION

Figure 1:
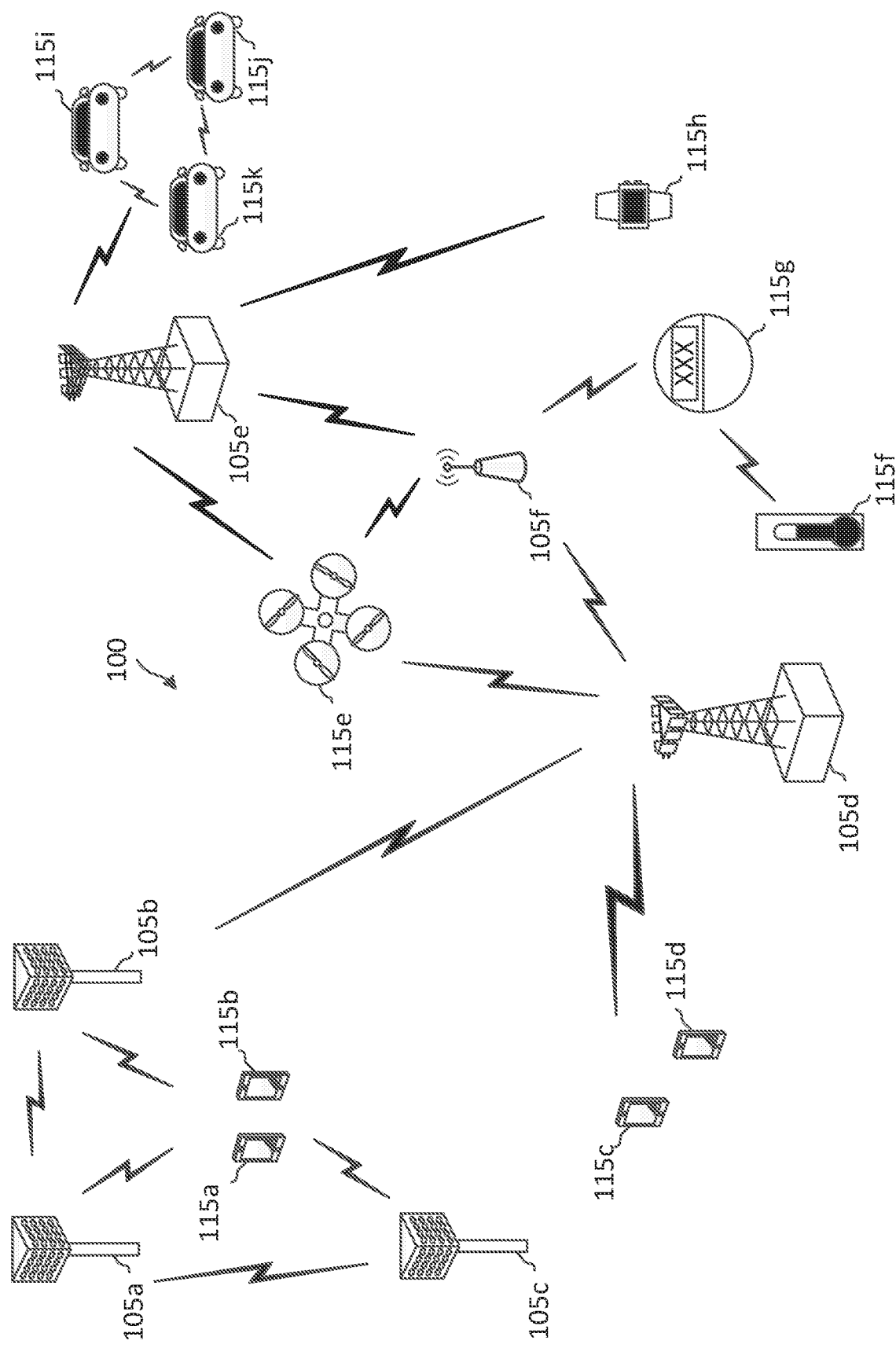
FIG. 1 illustrates a wireless communication network according to some embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The present application describes mechanisms to determine the channel access priority (CAPC) to use for a data radio bearer (DRB) that includes multiple quality of service (QoS) flows for an UL configured grant transmission.

In some embodiments, a BS and a UE may employ a rules-based approach to determine what CAPC to use in a UL communication (e.g., during a configured grant transmission). The rules may be configured at the UE and the BS prior to a communication. For example, the UE may receive a transmission of data from the BS that includes multiple different QoS flows carried on a common DRB (also referred to herein as a logical channel, LCH). For example, the rule may be that different QoS flows carried on a common DRB are mapped by the BS based on each QoS flow in the common DRB having the same access priority. As another example, the rule may be that the UE select the CAPC based on the lowest access priority of the QoS flows on the common DRB. As another example, the rule may be that the UE select the CAPC based on the highest access priority of the QoS flows on the common DRB. As another example, the rule may be that the UE select the CAPC based on the lowest or highest priority from among a subset of QoS flows on the common DRB, where the subset is signaled by the BS.

As another example, the rule may be that the UE select the CAPC based on the priority of the greatest number of QoS flows on the common DRB that have the same priority. As another example, the BS may determine the CAPC to use for the common DRB (or a value that is determinative of CAPC) and signal that determination to the UE per the LCH, as well as updated such as when one or more QoS flows are added or removed from the DRB. As another example, the BS may configure multiple mappings via RRC signaling and dynamically change which mapping to use via MAC control element (CE), such as based on traffic patterns and traffic history of the QoS flows.

In some embodiments, the UE may receive one or more packets belonging to a QoS flow that the UE has not received in the common DRB. This may refer to reflective QoS. In such situations, the UE may update the access priority of the common DRB according to a known rule (such as one of the above-noted rules). The UE may receive the CAPC for this new QoS flow, such as in the received packet, in the service data adaptation protocol (SDAP) header, the packet data convergence protocol (PDCP) header, MAC CE, RRC signaling, or PDCP control PDU. This may instead, or additionally, include the UE receiving the 5QI for this QoS flow, such as in a received packet, or SDAP header, PDCP header, MAC CE, RRC signaling, or PDCP control PDU. The CAPC for the common DRB may be updated according to one or more of the above rules with this new information for the new QoS flow. Further, when the BS adds or removes QoS flows (one or multiple) for the common DRB, the UE may update the CAPC of the common DRB based on the rule(s) in effect (such as from among those discussed above). Further, whenever the CAPC changes with respect to the common DRB for an UL transmission from the UE, the new CAPC may be applied to subsequent UL transmissions for the common DRB, or alternatively may begin application when received. In general, when a new QoS flow is added, or when an existing QoS flow is removed from a common DRB, the CAPC may be signaled to the UE (or, alternatively to the CAPC, the 5QI for the QoS flow).

Aspects of the present application provide several benefits. For example, embodiments of the present disclosure enable UEs to determine what CAPC to apply to a common DRB on the uplink for a transmission (e.g., in configured grant scenarios or in dynamic grant scenarios), when the common DRB includes multiple QoS flows with potentially different 5QIs from each other. Additional features and benefits of the present disclosure are set forth in the following description.

FIG. 1 illustrates a wireless communication network 100 according to some embodiments of the present disclosure. The network 100 may be a 5G network. The network 100 includes a number of base stations (BSs) 105 (individually labeled as 105a, 105b, 105c, 105d, 105e, and 105f) and other network entities. ABS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" may refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115k are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink and/or uplink, or desired transmission between BSs, and backhaul transmissions between BSs.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as in a vehicle-to-vehicle (V2V) communication.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In an embodiment, the BSs 105 may assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication may be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes may be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal may have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe may be DL-centric or UL-centric. A DL-centric subframe may include a longer duration for DL communication than for UL communication. A UL-centric subframe may include a longer duration for UL communication than for UL communication.

In an embodiment, the network 100 may be an NR network deployed over a licensed spectrum. The BSs 105 may transmit synchronization signals (e.g., including a primary synchronization signal (PSS) and a secondary synchronization signal (SSS)) in the network 100 to facilitate synchronization. The BSs 105 may broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In an embodiment, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, and SRS.

After obtaining the MIB, the RMSI and/or the OSI, the UE 115 may perform a random access procedure to establish a connection with the BS 105. In a four-step random access procedure, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a backoff indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response may be referred to as a message 1 (MSG 1), a message 2 (MSG 2), a message 3 (MSG 3), and a message 4 (MSG 4), respectively. According to embodiments of the present disclosure, the random access procedure may be a two-step random access procedure, where the UE 115 may transmit a random access preamble and a connection request in a single transmission and the BS 105 may respond by transmitting a random access response and a connection response in a single transmission. The combined random access preamble and connection request in the two-step random access procedure may be referred to as a message A (msgA). The combined random access response and connection response in the two-step random access procedure may be referred to as a message B (msgB).

After establishing a connection, the UE 115 and the BS 105 can enter an operational state, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant. Further, the UE 115 may transmit a UL communication signal to the BS 105 according to a configured grant scheme.

A configured grant transmission is an unscheduled transmission, performed on the channel without a UL grant. A configured grant UL transmission may also be referred to as a grantless, grant-free, or autonomous transmission. In some examples, the UE 115 may transmit a UL resource via a configured grant. Additionally, configured-UL data may also be referred to as grantless UL data, grant-free UL data, unscheduled UL data, or autonomous UL (AUL) data. Additionally, a configured grant may also be referred to as a grant-free grant, unscheduled grant, or autonomous grant. The resources and other parameters used by the UE for a configured grant transmission may be provided by the BS in one or more of a RRC configuration or an activation DCI, without an explicit grant for each UE transmission. The CAPC informs the UE 115 with respect to parameters to be used in performing Listen-Before-Talk (LBT) before transmitting on the configured grant resource (e.g., a higher CAPC having a shorter LBT timing and a lower CAPC having a longer LBT timing due to lower priority). Challenges may arise when multiple QoS flows are permitted on a given data radio bearer (DRB), instead of a one-to-one mapping. With a many-to-one mapping possible, the UE may not be able to determine what CAPC to use for a configured grant UL.

In some embodiments, the BS 105 and the UE 115 may employ a rules-based approach to determine what CAPC to use in an UL transmission, including for example a configured grant UL communication or a dynamic grant UL communication. The rules may be configured at the UE 115 and the BS 105 prior to a communication. For example, the UE 115 may receive a transmission of data from the BS 105 that includes multiple different QoS flows carried on a common DRB (also referred to herein as a logical channel, LCH).

For example, the rule may be that different QoS flows carried on a common DRB are mapped by the BS 105 based on each QoS flow in the common DRB having the same access priority (such as determined by the QoS flow's QoS identifier (5QI) at the BS 105). As another example, the rule may be that the UE 115 select the CAPC based on the lowest access priority of the QoS flows on the common DRB. As another example, the rule may be that the UE 115 select the CAPC based on the highest access priority of the QoS flows on the common DRB. As another example, the rule may be that the UE 115 select the CAPC based on the lowest or highest priority from among a subset of QoS flows on the common DRB, where the subset is signaled by the BS 105. As another example, the rule may be that the UE 115 select the CAPC based on the priority of the greatest number of QoS flows on the common DRB that have the same priority. As another example, the BS 105 may determine the CAPC (or a value that is determinative of CAPC) for the common DRB and signal that determination to the UE 115 per the LCH, as well as updated such as when one or more QoS flows are added or removed from the common DRB. As another example, the BS 105 may configure multiple mappings via RRC signaling and dynamically change which mapping to use via MAC control element (CE), such as based on traffic patterns and traffic history of the QoS flows.

In some embodiments, the UE 115 may receive one or more packets belonging to a QoS flow that the UE 115 has not received in the common DRB. This may refer to reflective QoS. In such situations, the UE 115 may update the access priority of the common DRB according to a known rule (such as one of the above-noted rules). The UE 115 may receive the CAPC for this new QoS flow, such as in the received packet, in the service data adaptation protocol (SDAP) header, the packet data convergence protocol (PDCP) header, MAC CE, RRC signaling, or PDCP control PDU. This may instead, or additionally, include the UE 115 receiving the 5QI for this QoS flow, such as in a received packet, or SDAP header, PDCP header, MAC CE, RRC signaling, or PDCP control PDU. With this additional information for the new QoS flow, the CAPC for the common DRB may be updated according to one or more of the above rules.

Further, when the BS 105 adds or removes QoS flows (one or multiple) for the common DRB, the UE 105 may update the CAPC of the common DRB based on the rule(s) in effect (such as from among those discussed above). Further, whenever the CAPC changes with respect to the common DRB for an UL transmission from the UE 115, the new CAPC may be applied to subsequent UL transmissions for the common DRB, or alternatively may begin application when received. In general, when a new QoS flow is added, or when an existing QoS flow is removed from a common DRB, the CAPC may be signaled to the UE 115 (or, alternatively to the CAPC, the 5QI for the QoS flow).

As a result, embodiments of the present disclosure enable UEs 115 to determine what CAPC to apply to a DRB on the uplink for a transmission (e.g., in configured grant scenarios or in dynamic grant scenarios), when the common DRB includes multiple QoS flows with potentially different 5QIs/access priorities determined from the 5QIs from each other.

The network 100 may operate over a shared frequency band or an unlicensed frequency band, for example, at about 3.5 gigahertz (GHz), sub-6 GHz or higher frequencies in the mmWave band. The network 100 may partition a frequency band into multiple channels, for example, each occupying about 20 megahertz (MHz). The BSs 105 and the UEs 115 may be operated by multiple network operating entities sharing resources in the shared communication medium and may acquire channel occupancy time (COT) in the share medium for communications. A COT may be non-continuous in time and may refer to an amount of time a wireless node can send frames when it has won contention for the wireless medium. Each COT may include a plurality of transmission slots. A COT may also be referred to as a transmission opportunity (TXOP).

Figure 2:
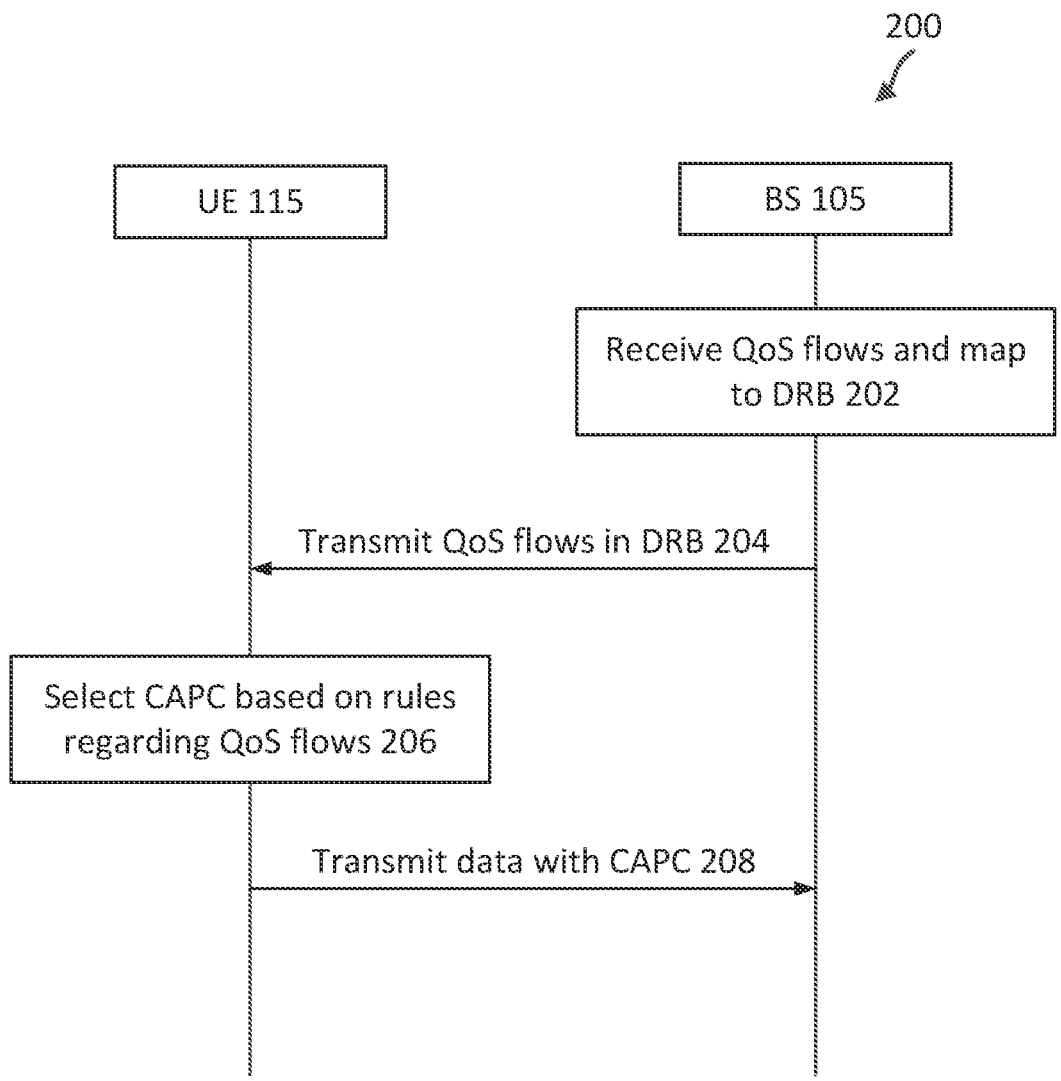
FIG. 2 illustrates a protocol diagram of a wireless communication method according to some embodiments of the present disclosure.

FIG. 2 illustrates a protocol diagram of a wireless communication method 200, particularly a CAPC determination procedure, between a UE 115 and a BS 105 according to some embodiments of the present disclosure.

At action 202, the BS 105 receives QoS flows from the core network gateway function and maps the QoS flows to a common DRB. For example, the QoS flows may correspond to packets that were filtered at the core network level (e.g., user plane function, UPF) into the different QoS flows. There may be multiple DRBs between a BS 105 and a UE 115, and a one-to-many relationship between the QoS flows and a common DRB. Thus, though there may be multiple DRBs, and any number of QoS flows in any of them, discussion herein will describe exemplary cases with respect to a given DRB with multiple QoS flows mapped to it for sake of discussion.

At action 204, the BS 105 transmits the QoS flows in the common DRB to the UE 115. For example, where three QoS flows (as just an exemplary value) are all mapped to the common DRB, those three QoS flows are transmitted as part of that common DRB to the UE 115. One or more aspects of information pertaining to CAPC may be included in the transmission, for example in a header of the packet or a MAC CE, or RRC signaling, etc.

At action 206, the UE 115 selects a CAPC for an UL transmission based on a rule. The UL transmission may be a configured grant transmission or a dynamic grant transmission, with examples herein discussing configured grant transmission to illustrate examples. The rules may include a rule from those identified in the discussion relating to FIG. 1 above, e.g., the QoS flows on a common DRB all are assigned to the common DRB by the BS 105 based on a shared QoS indicator (e.g., 5QI) and so the CAPC for the common DRB is selected based on that assignment, or based on the highest priority of the QoS flows in the common DRB, or based on the lowest priority of the QoS flows in the common DRB, or based on the priority of a subset of the QoS flows identified by BS 105 signaling and/or of the QoS flows that share the same 5QI (identified, for example, by a mapping between QoS flow identifier (QFI) and 5QI).

At action 208, the UE 115 uses the CAPC determined from action 206 in performing a transmission for the common DRB (e.g., on configured grant resources) on the uplink to the BS 105. The value of the CAPC may determine the level of priority given for an LBT procedure on the uplink.

Figure 3:
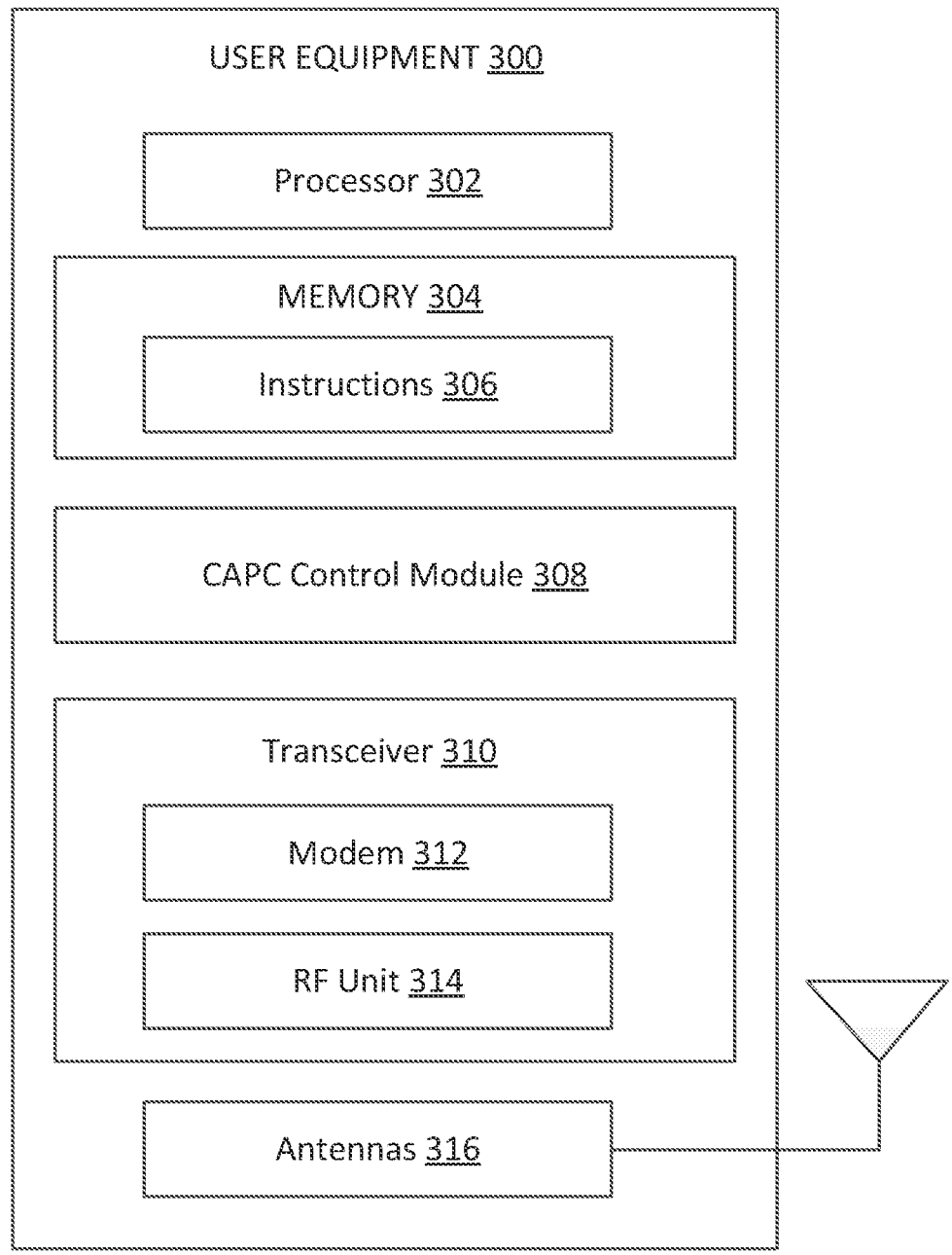
FIG. 3 is a block diagram of a user equipment (UE) according to some embodiments of the present disclosure.

FIG. 3 is a block diagram of an exemplary UE 300 according to embodiments of the present disclosure. The UE 300 may be a UE 115 discussed above in FIGS. 1 and 2. As shown, the UE 300 may include a processor 302, a memory 304, a CAPC control module 308, a transceiver 310 including a modem subsystem 312 and a radio frequency (RF) unit 314, and one or more antennas 316. These elements may be in direct or indirect communication with each other, for example via one or more buses.

The processor 302 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 304 includes a non-transitory computer-readable medium. The memory 304 may store, or have recorded thereon, instructions 306. The instructions 306 may include instructions that, when executed by the processor 302, cause the processor 302 to perform the operations described herein with reference to the UEs 115 in connection with embodiments of the present disclosure, for example, aspects of FIGS. 1-2 and 5-8. Instructions 306 may also be referred to as program code. The program code may be for causing a wireless communication device (or specific component(s) of the wireless communication device) to perform these operations, for example by causing one or more processors (such as processor 302) to control or command the wireless communication device (or specific component(s) of the wireless communication device) to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The CAPC control module 308 may be implemented via hardware, software, or combinations thereof. For example, CAPC control module 308 may be implemented as a processor, circuit, and/or instructions 306 stored in the memory 304 and executed by the processor 302. In some examples, the CAPC control module 308 can be integrated within the modem subsystem 312. For example, the CAPC control module 308 can be implemented by a combination of software components (e.g., executed by a DSP or a general processor) and hardware components (e.g., logic gates and circuitry) within the modem subsystem 312.

The CAPC control module 308 may be used for various aspects of the present disclosure, for example, aspects of FIGS. 1-2 and 5-8. The CAPC control module 308 is configured to communicate with other components of the UE 300 to transmit of one or more transmissions (e.g., configured grant) with a determined CAPC for a common DRB, receive one or more DL messages such as QoS flows on a common DRB, determine a CAPC from the various QoS flows on the common DRB, determine whether a timer has expired, start a timer, cancel a timer, stop a timer, determine whether a transmission counter has reached a threshold, reset a transmission counter, restart a random access procedure, trigger RLF, and/or perform other functionalities related to the CAPC determination procedures of a UE described in the present disclosure.

As shown, the transceiver 310 may include the modem subsystem 312 and the RF unit 314. The transceiver 310 can be configured to communicate bi-directionally with other devices, such as the BSs 105. The modem subsystem 312 may be configured to modulate and/or encode the data from the memory 304, and/or the CAPC control module 308 according to a modulation and coding scheme (MCS) (e.g., a low-density parity check (LDPC) coding scheme, a turbo coding scheme, a convolutional coding scheme, a digital beamforming scheme, etc.). The RF unit 314 may be configured to process (e.g., perform analog to digital conversion or digital to analog conversion, etc.) modulated/encoded data (e.g., UL data bursts, RRC messages, configured grant transmissions, ACK/NACKs for DL data bursts) from the modem subsystem 312 (on outbound transmissions) or of transmissions originating from another source such as a UE 115 or a BS 105. The RF unit 314 may be further configured to perform analog beamforming in conjunction with the digital beamforming. Although shown as integrated together in transceiver 310, the modem subsystem 312 and the RF unit 314 may be separate devices that are coupled together at the UE 300 to enable the UE 300 to communicate with other devices.

The RF unit 314 may provide the modulated and/or processed data (e.g., data packets or, more generally, data messages that may contain one or more data packets and other information) to the antennas 316 for transmission to one or more other devices. The antennas 316 may further receive data messages transmitted from other devices. The antennas 316 may provide the received data messages for processing and/or demodulation at the transceiver 310. The transceiver 310 may provide the demodulated and decoded data (e.g., system information message(s), RACH message(s) (e.g., DL/UL scheduling grants, DL data bursts, RRC messages, ACK/NACK requests) to the CAPC control module 308 for processing. The antennas 316 may include multiple antennas of similar or different designs in order to sustain multiple transmission links. The RF unit 314 may configure the antennas 316.

In an embodiment, the UE 300 can include multiple transceivers 310 implementing different RATs (e.g., NR and LTE). In an embodiment, the UE 300 can include a single transceiver 310 implementing multiple RATs (e.g., NR and LTE). In an embodiment, the transceiver 310 can include various components, where different combinations of components can implement different RATs.

Figure 4:
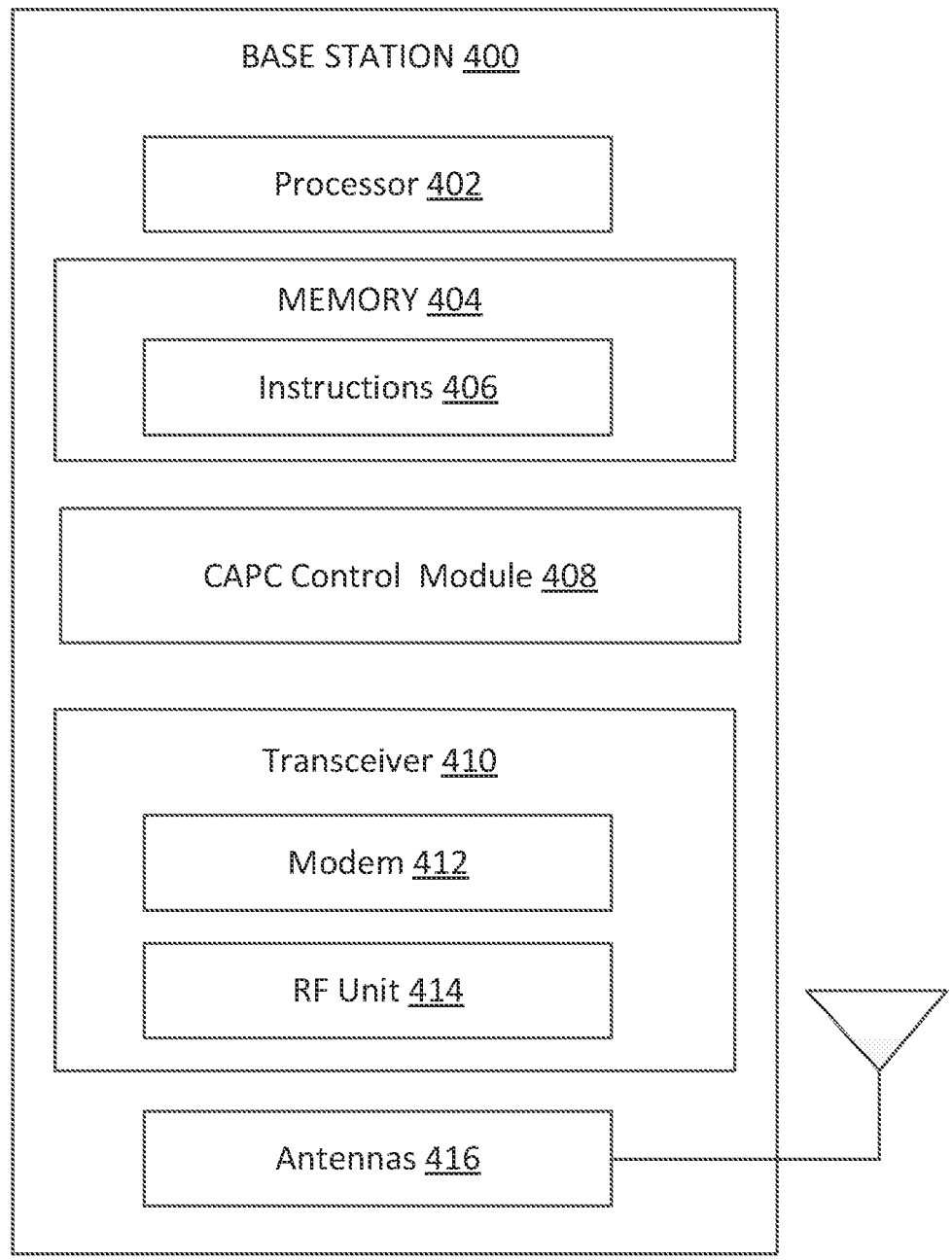
FIG. 4 is a block diagram of an exemplary base station (BS) according to embodiments of the present disclosure.

FIG. 4 is a block diagram of an exemplary BS 400 according to embodiments of the present disclosure. The BS 400 may be a BS 105 as discussed above in FIGS. 1 and 2. As shown, the BS 400 may include a processor 402, a memory 404, a CAPC control module 408, a transceiver 410 including a modem subsystem 412 and a RF unit 414, and one or more antennas 416. These elements may be in direct or indirect communication with each other, for example via one or more buses.

The processor 402 may have various features as a specific-type processor. For example, these may include a CPU, a DSP, an ASIC, a controller, a FPGA device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 404 may include a non-transitory computer-readable medium. The memory 404 may store instructions 406. The instructions 406 may include instructions that, when executed by the processor 402, cause the processor 402 to perform operations described herein, for example, aspects of FIGS. 1-2 and 5-8. Instructions 406 may also be referred to as code, which may be interpreted broadly to include any type of computer-readable statement(s) as discussed above with respect to FIG. 3.

The CAPC control module 408 may be implemented via hardware, software, or combinations thereof. For example, the CAPC control module 408 may be implemented as a processor, circuit, and/or instructions 406 stored in the memory 404 and executed by the processor 402. In some examples, the CAPC control module 408 can be integrated within the modem subsystem 412. For example, the CAPC control module 408 can be implemented by a combination of software components (e.g., executed by a DSP or a general processor) and hardware components (e.g., logic gates and circuitry) within the modem subsystem 412.

The CAPC control module 408 may be used for various aspects of the present disclosure, for example, aspects of FIGS. 1-2 and 5-8. The CAPC control module 408 is configured to map QoS flows to a DRB (e.g., multiple to a common DRB and/or to different DRBs), transmit or retransmit multiple QoS flows as part of the common DRB, transmit one or more DL scheduling grants to a UE indicating DL resources (e.g., time-frequency resources), transmit DL data to the UE, receive one or more UL transmissions (e.g., configured grant) based on a CAPC determined for the common DRB with multiple QoS flows, etc.

The CAPC control module 408 is configured to communicate with other components of the BS 400 to map QoS flows to DRB(s), transmit the DRB with multiple QoS flows, receive one or more UL transmissions (e.g., configured grant) based on CAPC determined for the common DRB having multiple QoS flows, determine whether a timer has expired, start a timer, cancel a timer, determine whether a transmission counter has reached a threshold, reset a transmission counter, terminate a random access procedure, and/or perform other functionalities related to the CAPC determination for DRBs having multiple QoS flows described in the present disclosure.

As shown, the transceiver 410 may include the modem subsystem 412 and the RF unit 414. The transceiver 410 can be configured to communicate bi-directionally with other devices, such as the UEs 115 and/or 300 and/or another core network element. The modem subsystem 412 may be configured to modulate and/or encode data according to a MCS (e.g., a LDPC coding scheme, a turbo coding scheme, a convolutional coding scheme, a digital beamforming scheme, etc.). The RF unit 414 may be configured to process (e.g., perform analog to digital conversion or digital to analog conversion, etc.) modulated/encoded data (e.g., RRC messages, DL data of multiple QoS flows mapped to the same DRB, etc.) from the modem subsystem 412 (on outbound transmissions) or of transmissions originating from another source, such as a UE 115 or 300. The RF unit 414 may be further configured to perform analog beamforming in conjunction with the digital beamforming. Although shown as integrated together in transceiver 410, the modem subsystem 412 and/or the RF unit 414 may be separate devices that are coupled together at the BS 400 to enable the BS 400 to communicate with other devices.

The RF unit 414 may provide the modulated and/or processed data, (e.g., data packets or, more generally, data messages that may contain one or more data packets and other information) to the antennas 416 for transmission to one or more other devices. This may include, for example, communication with a camped UE 115 or 300 according to embodiments of the present disclosure. The antennas 416 may further receive data messages transmitted from other devices and provide the received data messages for processing and/or demodulation at the transceiver 410. The transceiver 410 may provide the demodulated and decoded data (e.g., RRC messages, UL data of multiple QoS flows mapped to the same DRB, UL data, etc.) to the CAPC control module 408 for processing. The antennas 416 may include multiple antennas of similar or different designs in order to sustain multiple transmission links.

In an embodiment, the BS 400 can include multiple transceivers 410 implementing different RATs (e.g., NR and LTE). In an embodiment, the BS 400 can include a single transceiver 410 implementing multiple RATs (e.g., NR and LTE). In an embodiment, the transceiver 410 can include various components, where different combinations of components can implement different RATs.

Figure 5:
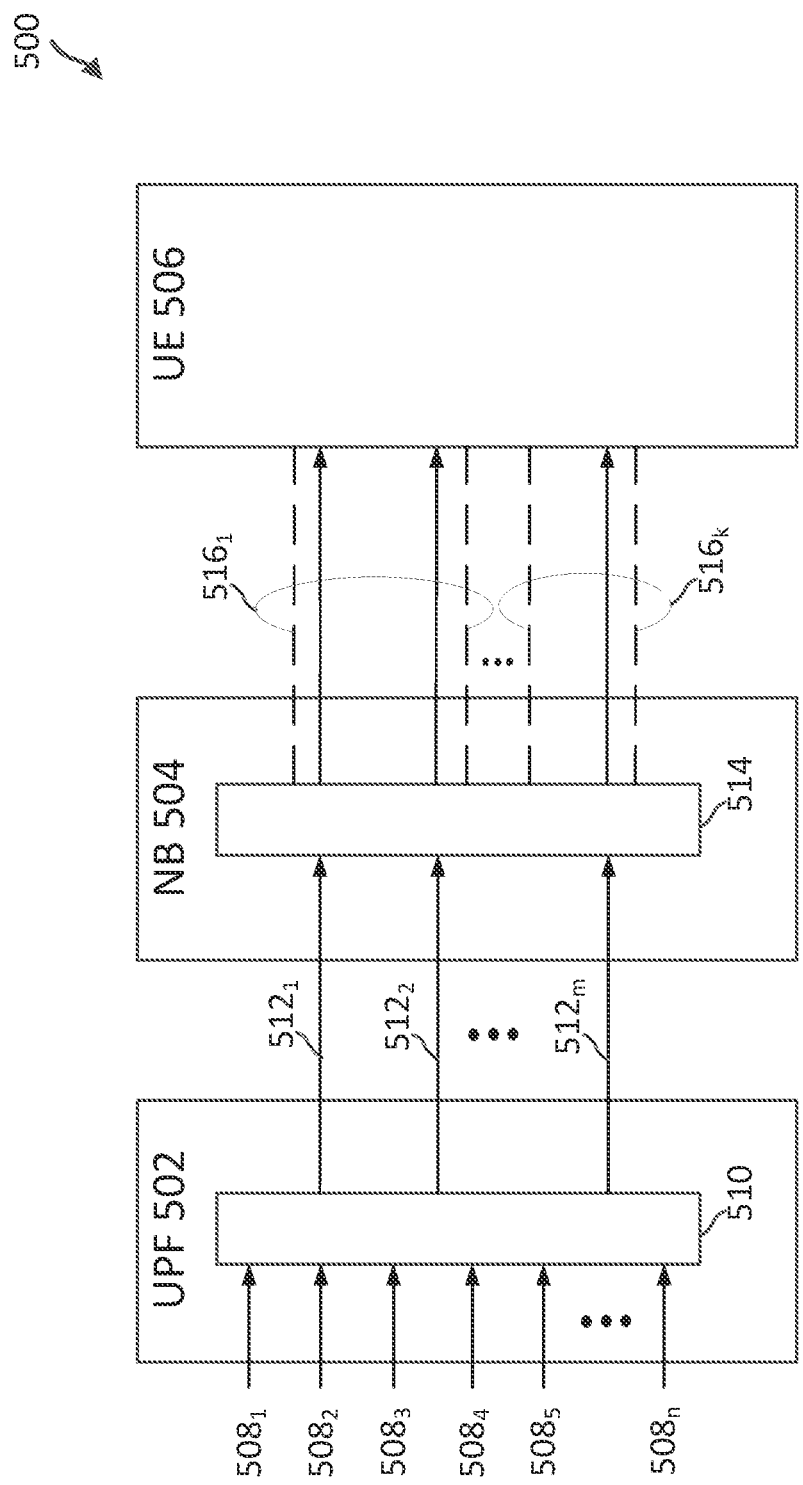
FIG. 5 illustrates a wireless communication network interaction according to some embodiments of the present disclosure.

Turning now to FIG. 5, a wireless communication network interaction 500 is illustrated according to some embodiments of the present disclosure. For example, illustrated are some logical flows between a UPF 502, NB 504, and UE 506. While there may be several NBs 504, and many UEs 506, to which embodiments of the present disclosure may apply, one of each is illustrated herein for simplicity of illustration and discussion. The UPF 502 (user plane function) provides transport of data between the NB 504 and the core network, and may represent a given gateway physical device, or functionally represent operations performed at one or multiple devices at one or multiple logical levels in the operations according to embodiments of the present disclosure. The NB 504 may be an example of the BS 115 and BS 400 as discussed herein. The UE 506 may be an example of the UE 115 and UE 300 as discussed herein. Additional operations and functions are performed between the three entities illustrated in FIG. 5 in addition to the CAPC determination aspects described herein.

Data packets arrive at the UPF 502 from one or more applications applicable to the UE 506. These data packets are illustrated as data packets $508_1$ through $508_n$. At the UPF 502, the packets 508 are filtered by filter function 510 to map into QoS flows $512_1$ through $512_m$. While illustrated as a single filter function 510, the filter function 510 may be any combination of filters implemented in software and/or hardware to accomplish the filtering result illustrated herein. Further to being mapped to QoS flows $512_1$ through $512_m$, the filter function 510 may apply marking to the packets of each mapped QoS flow 512. The marking may be, for example, a different QFI for each QoS flow, for example based on a 5QI (or other representation to map a QoS level to one or more QoS characteristics for the given packets/QoS flow). As just one example to illustrate embodiments of the present disclosure, the data packets $508_1$ through $508_3$ may be mapped by the filter function 510 to QoS flow $512i$, data packets $508_4$ and $508_5$ to QoS flow $512_2$, and data packet $508_n$ (either one or multiple packets) to QoS flow $512_m$.

The QoS flows $512_1$ through $512_m$ are sent to the NB 504. This may be accomplished, for example, via a PDU session such as a single tunnel session for all of the QoS flows of the PDU session. At the NB 504, the QoS flows $512_1$ through $512_m$ are mapped to one or more DRBs $516_1$ through $516_k$ for transport to the UE 506 by mapping function 514. While illustrated as a single mapping function 514, the mapping function 514 may be any combination of filters implemented in software and/or hardware to accomplish the mapping result illustrated herein. As just one example, the QoS flows 5121 and 5122 may be mapped to a first DRB $516_1$, and the QoS flow $512_m$ may be mapped to a DRB $516_k$. As illustrated, therefore, there is a one-to-many relationship between the DRB $516_1$ and the QoS flows $512_1$ and $512_2$ mapped to it.

The data is transmitted via the DRBs $516_1$ through $516_k$ to the UE 506. Because of the one-to-many nature, however, a given DRB (such as DRB $516_1$ in the illustrated example) may have multiple QoS flows with respective QFIs. The UE 506 determine what CAPC to apply for the common DRB on an uplink communication (e.g., configured grant), which may be accomplished according to embodiments of the present disclosure. This may be accomplished, for example, by applying one or more rules as discussed above and further below.

An exemplary table format 600 for a mapping relationship according to some embodiments of the present disclosure is illustrated in FIG. 6, which may provide a mapping between a CAPC and the various 5QIs. This is exemplary, and other mappings may be applicable as well, and benefit from, aspects of the present disclosure. As illustrated, a first column 602 lists the different CAPCs. A second column lists the corresponding 5QI(s) that correspond to a given CAPC. This correspondence is illustrated by rows 606. In the illustrated examples, therefore, CAPC 1 may map the several 5QIs listed in the same row 606 as the CAPC 1, and so on through CAPC 4. In the illustrated example table 600, the lower numbers have higher priority than the higher numbers.

Figure 7:
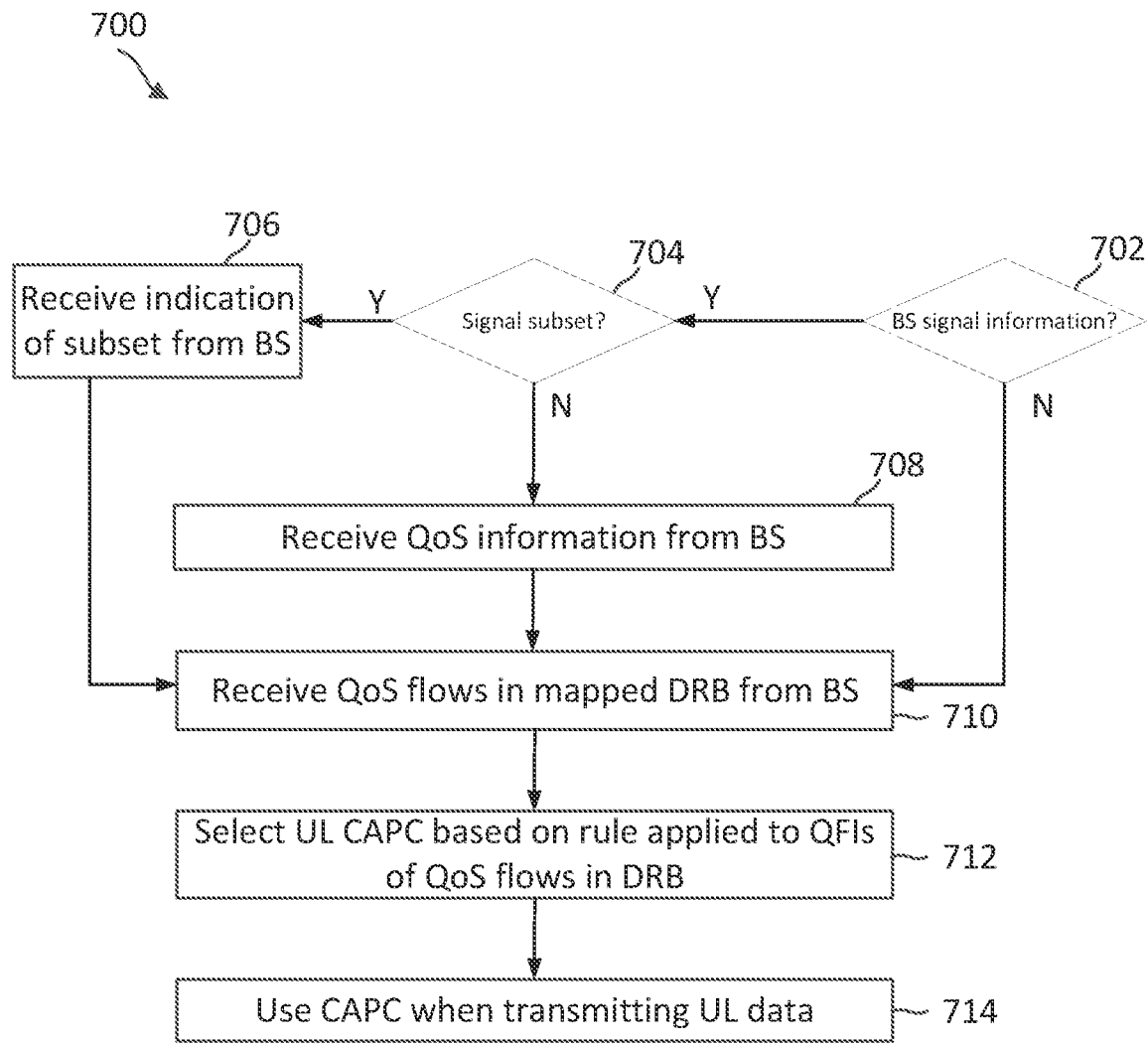
FIG. 7 illustrates a flow diagram of a wireless communication method according to some embodiments of the present disclosure.

FIG. 7 illustrates a flow diagram of a wireless communication method 700 for determining and using a CAPC for an UL transmission (e.g., configured grant) in situations where there may be multiple QoS flows on a common DRB, according to some embodiments of the present disclosure. Aspects of the method 700 can be executed by a wireless communication device, such as the UEs 115, 300, and/or 506 utilizing one or more components, such as the processor 302, the memory 304, the CAPC control module 308, the transceiver 310, the modem 312, the one or more antennas 316, and various combinations thereof. As illustrated, the method 700 includes a number of enumerated steps, but embodiments of the method 700 may include additional steps before, during, after, and in between the enumerated steps. Further, in some embodiments, one or more of the enumerated steps may be omitted or performed in a different order.

At decision block 702, if the BS 105 is configured to signal information relevant to the CAPC determination at the UE 115 outside of a given QoS flow (such as a QoS flow 512 illustrated in FIG. 5), such as a determined CAPC for the common DRB itself, or 5QI, or subset information, or other information for the UE 115 to apply with respect to one or more rules to determine the CAPC for the common DRB, then the method 700 proceeds to decision block 704.

At decision block 704, if the BS 105 is configured in particular to signal information regarding a subset of QoS flows to use in determining a CAPC for a common DRB transmission on the uplink, then the method 700 proceeds to block 706.

At block 706, the UE 115 receives an indication of subset information from the BS 105. The indication may include a list of the QoS flows that comprise the subset, or some smaller representation such as a short bit pattern that the UE 115 uses to look up, in a corresponding table, what subset the pattern identifies. The UE 115 may be configured to implement the subset signaled by the BS 105 to determine the CAPC for the common DRB based on the lowest or highest priority from among the QoS flows identified by the BS 105. The method 700 then proceeds from block 706 to block 710 as described further below.

Returning to decision block 704, if the BS 105 is not configured to specifically signal subset information, the method 700 instead proceeds to block 708. At block 708, the UE 115 receives QoS information from the BS 105. This may include different information depending on what rule(s) the UE 115 has been configured to implement in order to determine a CAPC for the UL transmission. For example, where the rule includes the BS 105 informing the UE 115 of what CAPC to use for the common DRB, the QoS information may be the determined CAPC. As another example, the QoS information may be 5QIs for the QoS flows (one or more of them). As yet another example, the BS 105 may configure multiple mappings via RRC signaling and dynamically change which mapping to use via MAC control element (CE), such as based on traffic patterns and traffic history of the QoS flows, which may be received as the QoS information at block 708. The method 700 then proceeds to block 710 as will be discussed further below.

Returning to decision block 702, if the BS 105 is not configured to signal information relevant to the CAPC determination at the UE 115 outside of a given QoS flow, then the method 700 proceeds to block 710.

At block 710, the UE 105 receives QoS flows mapped to a common DRB from the BS 105 as part of a PDU session.

FIG. 5 illustrates an example where multiple QoS flows 512 are mapped to a common DRB 516. With multiple QoS flows, the UE 105 applies one or more rules as discussed herein to determine what CAPC to use for configured grant transmission.

At block 712, the UE 105 selects an UL CAPC based on a rule applied to QoS information of the QoS flows of the common DRB. For example, the rule may be that different QoS flows carried on a common DRB are mapped by the BS 105 based on each QoS flow in the common DRB having the same access priority (such as determined by the QoS flow's 5QI). Thus, the rule at the UE 105 may be to apply the access priority for the grouped QoS flows in selecting the CAPC for the UL transmission (e.g., configured grant).

As another example, the rule may be that the UE 115 select the CAPC based on the lowest access priority, or the highest access priority, of the QoS flows on the common DRB. As another example, the rule may be that the UE 115 select the CAPC based on the lowest or highest priority from among a subset of QoS flows on the common DRB, where the subset is signaled by the BS 105 as discussed above with respect to block 706. As another example, the rule may be that the UE 115 select the CAPC based on the priority of the greatest number of QoS flows on the common DRB that have the same priority.

As another example, the BS 105 may determine the CAPC (or a value that is determinative of CAPC) and signal that determination to the UE 115 per the LCH, as well as updated such as when one or more QoS flows are added or removed from the common DRB (for example, as discussed above with respect to block 708). As another example, the BS 105 may configure multiple mappings via RRC signaling and dynamically change which mapping to use via MAC control element (CE), such as based on traffic patterns and traffic history of the QoS flows (as discussed with respect to block 708 above).

In some embodiments, the UE 115 may receive one or more packets belonging to a QoS flow that the UE 115 has not received in the common DRB. This may refer to reflective QoS. In such situations, the UE 115 may update the access priority of the common DRB according to a known rule (such as one of the above-noted rules). The UE 115 may receive the CAPC for this new QoS flow, such as in the received packet, in the SDAP header, the PDCP header, MAC CE, RRC signaling, or PDCP control PDU (which may occur at block 708 as discussed above). This may instead, or additionally, include the UE 115 receiving the 5QI for this QoS flow, such as in a received packet, or SDAP header, PDCP header, MAC CE, RRC signaling, or PDCP control PDU (which may occur, again, as discussed above with respect to block 708).

Further, when the BS 105 adds or removes QoS flows (one or multiple) for the common DRB, the UE 105 may update the CAPC of the common DRB based on the rule(s) in effect (such as from among those discussed above). Further, whenever the CAPC changes with respect to the common DRB for an UL transmission (e.g., configured grant) from the UE 115, the new CAPC may be applied to subsequent UL transmissions for the commonDRB, or alternatively may begin application when received (e.g., to retransmissions). In general, when a new QoS flow is added, or when an existing QoS flow is removed from the common DRB, the CAPC may be signaled to the UE 115 (or, alternatively to the CAPC, the 5QI for the QoS flow).

At block 714, the UE 115 uses the CAPC selected or determined from block 712 to transmit UL data on the common DRB.

Figure 8:
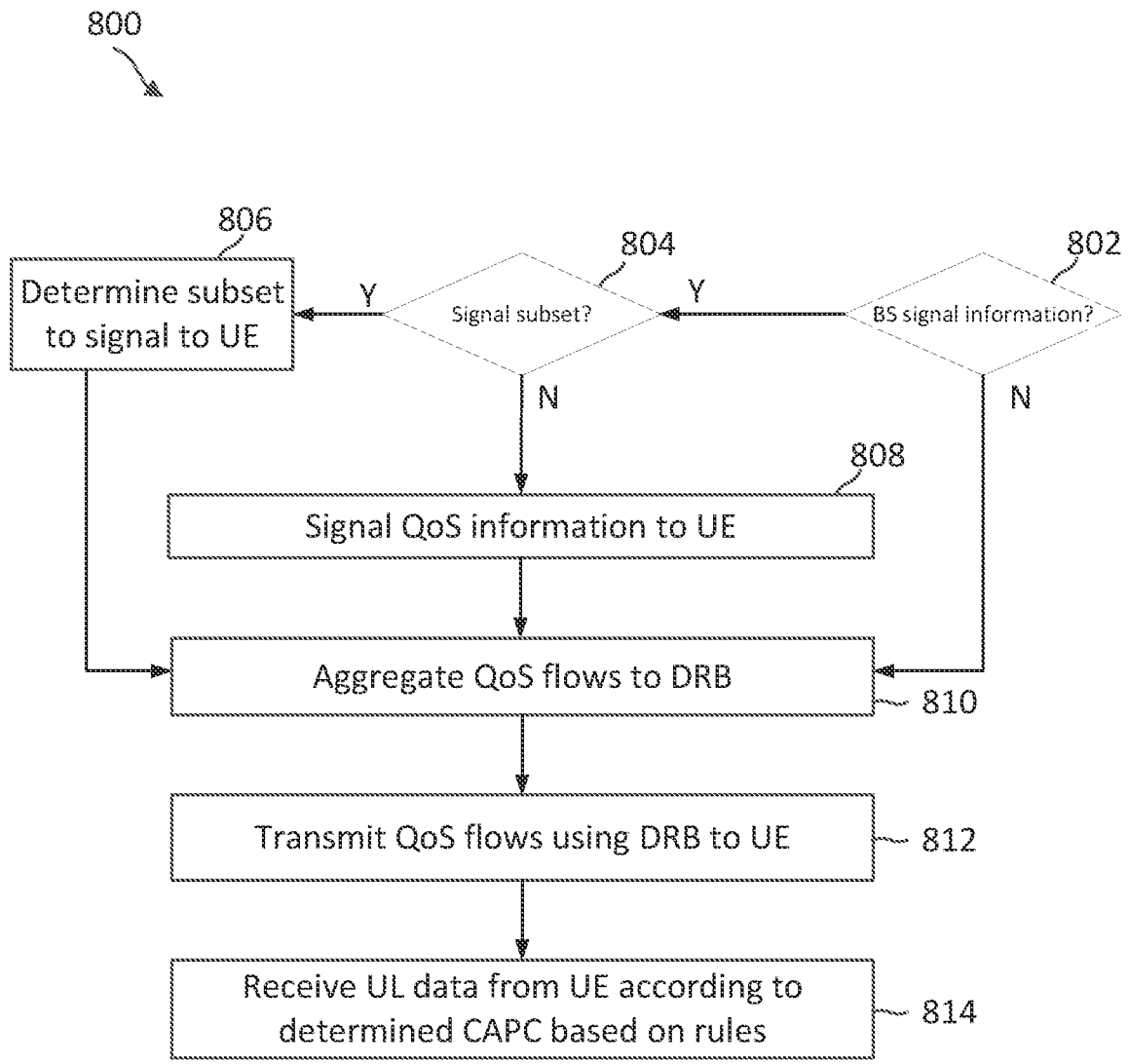
FIG. 8 illustrates a flow diagram of a wireless communication method according to some embodiments of the present disclosure.

FIG. 8 illustrates a flow diagram of a wireless communication method 800 for determining and using a CAPC for a transmission (e.g., configured grant) in situations where there may be multiple QoS flows on a common DRB, according to some embodiments of the present disclosure. Aspects of the method 800 can be executed by a wireless communication device, such as the BSs 105, 400, and/or 504 utilizing one or more components, such as the processor 402, the memory 404, the CAPC control module 408, the transceiver 410, the modem 412, the one or more antennas 416, and various combinations thereof. As illustrated, the method 800 includes a number of enumerated steps, but embodiments of the method 800 may include additional steps before, after, and in between the enumerated steps. In some embodiments, one or more of the enumerated steps may be omitted or performed in a different order.

At decision block 802, if the BS 105 is configured to signal information relevant to the CAPC determination at the UE 115 outside of a given QoS flow (such as a QoS flow 512 illustrated in FIG. 5), such as a determined CAPC itself, or 5QI, or subset information, or other information for the UE 115 to apply with respect to one or more rules, then the method 800 proceeds to decision block 804.

At decision block 804, if the BS 105 is configured in particular to signal information regarding a subset of QoS flows to use in determining a CAPC for the common DRB for use on the uplink, then the method 800 proceeds to block 806.

At block 806, the BS determines subset information to send to the UE 115. The subset information may be signaled as an indication to the UE 115, and may include a list of the QoS flows that comprise the subset, or some smaller representation such as a short bit pattern that the UE 115 uses to look up, in a corresponding table, what subset the pattern identifies. The UE 115 may be configured to implement the subset signaled by the BS 105 to determine the CAPC for the common DRB based on the lowest or highest priority from among the QoS flows identified by the BS 105. The BS 105 transmits the subset information to the UE 115 and the method 800 then proceeds from block 806 to block 810 as described further below.

Returning to decision block 804, if the BS 105 is not configured to specifically signal subset information, the method 800 instead proceeds to block 808. At block 808, the BS 105 transmits QoS information to the UE 115. This may include different information depending on what rule(s) the UE 115 has been configured to implement in order to determine a CAPC for the common DRB for UL transmission (e.g., configured grant). Examples of the rules were discussed with respect to block 708 in FIG. 7 above. The method 800 then proceeds to block 810 as will be discussed further below.

Returning to decision block 802, if the BS 105 is not configured to signal information relevant to the CAPC determination for the common DRB at the UE 115 outside of a given QoS flow, then the method 800 proceeds to block 810.

At block 810, the BS 105 aggregates (maps) the QoS flows into one or more DRBs. FIG. 5 illustrates an example where multiple QoS flows 512 are mapped to a common DRB 516.

At block 812, the BS 105 transmits the QoS flows of the common DRB to the UE 115 as part of a PDU session. With multiple QoS flows, the UE 105 applies one or more rules as discussed herein to determine what CAPC to use for the common DRB on the UL for UL transmission (e.g., configured grant).

At block 814, the BS 105 receives an UL transmission (e.g., configured grant) from the UE 105 with a CAPC for the common DRB on the UL determined based on the rules, such as one of those discussed above with respect to FIG. 7.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Further embodiments of the present disclosure include a non-transitory computer-readable medium having program code recorded thereon, the program code comprising code for causing a user equipment (UE) to receive, from a base station (BS), a plurality of downlink data packets comprising a corresponding plurality of quality of service flows (QoS flows), each the plurality of QoS flows being mapped to a common data radio bearer (DRB); code for causing the UE to select a channel access priority class (CAPC) for the common DRB for transmitting an UL data packet based on a rule applied to the plurality of QoS flows mapped to the common DRB; and code for causing the UE to transmit, to the BS, the uplink data packet with the selected CAPC.

The non-transitory computer-readable medium may also include wherein the plurality of QoS flows mapped to the common DRB comprise a corresponding plurality of CAPCs. The non-transitory computer-readable medium may also include wherein the plurality of QoS flows are mapped to the common DRB based on the corresponding plurality of CAPCs being the same among the plurality of QoS flows, wherein the code for causing the selecting further comprises code for causing the UE to select the CAPC for the common DRB based on the same CAPC. The non-transitory computer-readable medium may also include wherein a first CAPC from among the plurality of CAPCs comprises a lower access priority than a second CAPC from among the plurality of CAPCs, wherein the code for causing the selecting further comprises code for causing the UE to select the first CAPC based on the first CAPC comprising the lower access priority. The non-transitory computer-readable medium may also include wherein a first CAPC from among the plurality of CAPCs comprises a higher access priority than a second CAPC from among the plurality of CAPCs, wherein the code for causing the selecting further comprises code for causing the UE to select the first CAPC based on the first CAPC comprising the higher access priority. The non-transitory computer-readable medium may also include wherein the code for causing the selecting further comprises code for causing the UE to receive, from the BS, an identification of a subset of QoS flows from among the plurality of QoS flows. The non-transitory computer-readable medium may also include code for causing the UE to select the CAPC based on a QoS flow from the subset having a first CAPC comprising a lower access priority than CAPCs corresponding to a remainder of the subset. The non-transitory computer-readable medium may also include code for causing the UE to select the CAPC based on a QoS flow from the subset having a first CAPC comprising a higher access priority than CAPCs corresponding to a remainder of the subset. The non-transitory computer-readable medium may also include wherein the code for causing the selecting further comprises code for causing the UE to identify a first subset of QoS flows from among the plurality of QoS flows having first common CAPC; code for causing the UE to identify a second subset of QoS flows from among the plurality of QoS flows having a second common CAPC, the second common CAPC being different from the first common CAPC; and code for causing the UE to select the CAPC based on the first common CAPC in response to the first subset of QoS flows being greater than the second subset of QoS flows. The non-transitory computer-readable medium may also include wherein the code for causing the selecting further comprises code for causing the UE to receive, from the BS, a selection for the CAPC; and code for causing the UE to implement the received selection as the CAPC. The non-transitory computer-readable medium may also include code for causing the UE to receive, from the BS, a determined CAPC in response to a new QoS flow being added to the plurality of QoS flows. The non-transitory computer-readable medium may also include code for causing the UE to receive, from the BS, a determined QoS indicator in response to a new QoS flow being added to the plurality of QoS flows; and code for causing the UE to determine the CAPC based on the determined QoS indicator. The non-transitory computer-readable medium may also include wherein the plurality of QoS flows comprises a new QoS flow not used already for the common DRB, the code further comprising code for causing the UE to update the CAPC for the common DRB based on the rule. The non-transitory computer-readable medium may also include wherein the code for causing the transmitting further comprises code for causing the UE to transmit, to the BS, the UL data packet with the selected CAPC during a configured grant.

Further embodiments of the present disclosure include a non-transitory computer-readable medium having program code recorded thereon, the program code comprising code for causing a base station (BS) to map a plurality of downlink data packets comprising a corresponding plurality of quality of service flows (QoS flows) to a common data radio bearer (DRB); code for causing the BS to transmit, to a user equipment (UE), the plurality of downlink data packets on the common DRB; and code for causing the BS to receive, from the UE, an uplink (UL) data packet on the common DRB having a channel access priority class (CAPC) selected based on a rule applied to the plurality of QoS flows mapped to the common DRB.

The non-transitory computer-readable medium may also include wherein the plurality of QoS flows mapped to the common DRB comprise a corresponding plurality of CAPCs. The non-transitory computer-readable medium may also include wherein the plurality of QoS flows are mapped to the common DRB based on the corresponding plurality of CAPCs being the same among the plurality of QoS flows, the CAPC for the common DRB being selected based on the same CAPC. The non-transitory computer-readable medium may also include wherein a first CAPC from among the plurality of CAPCs comprises a lower access priority than a second CAPC from among the plurality of CAPCs, the first CAPC being selected based on the first CAPC comprising the lower access priority. The non-transitory computer-readable medium may also include wherein a first CAPC from among the plurality of CAPCs comprises a higher access priority than a second CAPC from among the plurality of CAPCs, the first CAPC being based on the first CAPC comprising the higher access priority. The non-transitory computer-readable medium may also include code for causing the BS to transmit, to the UE, an identification of a subset of QoS flows from among the plurality of QoS flows. The non-transitory computer-readable medium may also include the CAPC being based on a QoS flow from the subset having a first CAPC comprising a lower access priority than CAPCs corresponding to a remainder of the subset. The non-transitory computer-readable medium may also include the UL CAPC being based on a QoS flow from the subset having a first CAPC comprising a higher access priority than CAPCs corresponding to a remainder of the subset. The non-transitory computer-readable medium may also include the CAPC being based on a first subset of QoS flows from among the plurality of QoS flows being greater than a second subset of QoS flows from among the plurality of QoS flows, wherein the first subset of QoS flows has a first common CAPC and the second subset of QoS flows has a second common CAPC different from the first common CAPC. The non-transitory computer-readable medium may also include code for causing the BS to select the CAPC for the UE; and code for causing the BS to transmit, to the UE, the selection to the UE to implement. The non-transitory computer-readable medium may also include code for causing the BS to transmit, to the UE, a determined CAPC in response to a new QoS flow being added to the plurality of QoS flows. The non-transitory computer-readable medium may also include code for causing the BS to transmit, to the UE, a determined QoS indicator in response to a new QoS flow being added to the plurality of QoS flows. The non-transitory computer-readable medium may also include wherein the code for the receiving further comprises code for causing the BS to receive, from the UE, the UL data packet with the selected CAPC during a configured grant.

Further embodiments of the present disclosure include a user equipment including means for receiving, by the user equipment (UE) from a base station (BS), a plurality of downlink data packets comprising a corresponding plurality of quality of service flows (QoS flows), each the plurality of QoS flows being mapped to a common data radio bearer (DRB); means for selecting a channel access priority class (CAPC) for the common DRB for transmitting an UL data packet based on a rule applied to the plurality of QoS flows mapped to the common DRB; and means for transmitting, to the BS, the uplink data packet with the selected CAPC.

The user equipment may also include wherein the plurality of QoS flows mapped to the common DRB comprise a corresponding plurality of CAPCs. The user equipment may also include wherein the plurality of QoS flows are mapped to the common DRB based on the corresponding plurality of CAPCs being the same among the plurality of QoS flows, the means for selecting further comprising means for selecting the CAPC for the common DRB based on the same CAPC. The user equipment may also include wherein a first CAPC from among the plurality of CAPCs comprises a lower access priority than a second CAPC from among the plurality of CAPCs, the means for selecting further comprising means for selecting the first CAPC based on the first CAPC comprising the lower access priority. The user equipment may also include wherein a first CAPC from among the plurality of CAPCs comprises a higher access priority than a second CAPC from among the plurality of CAPCs, the means for selecting further comprising means for selecting the first CAPC based on the first CAPC comprising the higher access priority. The user equipment may also include wherein the means for selecting further comprises means for receiving, from the BS, an identification of a subset of QoS flows from among the plurality of QoS flows. The user equipment may also include means for selecting the CAPC based on a QoS flow from the subset having a first CAPC comprising a lower access priority than CAPCs corresponding to a remainder of the subset. The user equipment may also include means for selecting the CAPC based on a QoS flow from the subset having a first CAPC comprising a higher access priority than CAPCs corresponding to a remainder of the subset. The user equipment may also include wherein the means for selecting further comprises means for identifying a first subset of QoS flows from among the plurality of QoS flows having first common CAPC; means for identifying a second subset of QoS flows from among the plurality of QoS flows having a second common CAPC, the second common CAPC being different from the first common CAPC; and means for selecting the CAPC based on the first common CAPC in response to the first subset of QoS flows being greater than the second subset of QoS flows. The user equipment may also include wherein the means for selecting further comprises means for receiving, from the BS, a selection for the CAPC; and means for implementing the received selection as the CAPC. The user equipment may also include means for receiving, from the BS, a determined CAPC in response to a new QoS flow being added to the plurality of QoS flows. The user equipment may also include means for receiving, from the BS, a determined QoS indicator in response to a new QoS flow being added to the plurality of QoS flows; and means for determining the CAPC based on the determined QoS indicator. The user equipment may also include wherein the plurality of QoS flows comprises a new QoS flow not used already for the common DRB, further comprising means for updating the CAPC for the common DRB based on the rule. The user equipment may also include wherein the transmitting further comprises means for transmitting, to the BS, the UL data packet with the selected CAPC during a configured grant.

Further embodiments of the present disclosure include a base station including means for mapping, by the base station (BS), a plurality of downlink data packets comprising a corresponding plurality of quality of service flows (QoS flows) to a common data radio bearer (DRB); means for transmitting, to a user equipment (UE), the plurality of downlink data packets on the common DRB; and means for receiving, from the UE, an uplink (UL) data packet on the common DRB having a channel access priority class (CAPC) selected based on a rule applied to the plurality of QoS flows mapped to the common DRB.

The base station may also include wherein the plurality of QoS flows mapped to the common DRB comprise a corresponding plurality of CAPCs. The base station may also include wherein the plurality of QoS flows are mapped to the common DRB based on the corresponding plurality of CAPCs being the same among the plurality of QoS flows, the CAPC for the common DRB being selected based on the same CAPC. The base station may also include wherein a first CAPC from among the plurality of CAPCs comprises a lower access priority than a second CAPC from among the plurality of CAPCs, the first CAPC being selected based on the first CAPC comprising the lower access priority. The base station may also include wherein a first CAPC from among the plurality of CAPCs comprises a higher access priority than a second CAPC from among the plurality of CAPCs, the first CAPC being based on the first CAPC comprising the higher access priority. The base station may also include means for transmitting, to the UE, an identification of a subset of QoS flows from among the plurality of QoS flows. The base station may also include the CAPC being based on a QoS flow from the subset having a first CAPC comprising a lower access priority than CAPCs corresponding to a remainder of the subset. The base station may also include the UL CAPC being based on a QoS flow from the subset having a first CAPC comprising a higher access priority than CAPCs corresponding to a remainder of the subset. The base station may also include the CAPC being based on a first subset of QoS flows from among the plurality of QoS flows being greater than a second subset of QoS flows from among the plurality of QoS flows, wherein the first subset of QoS flows has a first common CAPC and the second subset of QoS flows has a second common CAPC different from the first common CAPC. The base station may also include means for selecting the CAPC for the UE; and means for transmitting, to the UE, the selection to the UE to implement. The base station may also include means for transmitting, to the UE, a determined CAPC in response to a new QoS flow being added to the plurality of QoS flows. The base station may also include means for transmitting, to the UE, a determined QoS indicator in response to a new QoS flow being added to the plurality of QoS flows. The base station may also include wherein the means for receiving further comprises means for receiving, from the UE, the UL data packet with the selected CAPC during a configured grant.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication performed by a user equipment (UE), comprising:
   receiving a plurality of data packets via a common data radio bearer (DRB), the common DRB comprising a plurality of mapped quality of service flows (QoS flows);
   implementing a channel access priority class (CAPC) for the common DRB for transmitting a response data packet based on a rule applied to the plurality of mapped QoS flows; and
   transmitting the response data packet with the implemented CAPC.

2. The method of claim 1, further comprising:
   receiving the CAPC for the common DRB, the CAPC determined by a separate wireless communications device per a logical channel (LCH) corresponding to each DRB.

3. The method of claim 2, wherein the plurality of mapped QoS flows are mapped to the common DRB based on a corresponding plurality of CAPCs being the same among the plurality of mapped QoS flows, the rule comprising implementing the CAPC for the common DRB based on the same CAPC.

4. The method of claim 2, wherein a first CAPC from among a plurality of CAPCs corresponding to the plurality of mapped QoS flows comprises a lower access priority than a second CAPC from among the plurality of CAPCs, the rule comprising implementing the first CAPC based on the first CAPC comprising the lower access priority.

5. The method of claim 2, wherein a first CAPC from among a plurality of CAPCs corresponding to the plurality of mapped QoS flows comprises a higher access priority than a second CAPC from among the plurality of CAPCs, the rule comprising implementing the first CAPC based on the first CAPC comprising the higher access priority.

6. The method of claim 2, wherein the rule comprises implementing the CAPC based on a QoS flow from a subset of QoS flows, the subset of QoS flows being from among the plurality of mapped QoS flows.

7. The method of claim 2, wherein the rule comprises implementing the CAPC based on a first common CAPC identified from a first subset of QoS flows from among the plurality of mapped QoS flows, the first subset of QoS flows being greater than a second subset of QoS flows having a second common CAPC different from the first common CAPC.

8. The method of claim 2, further comprising:
   receiving an update to the CAPC in response to a new QoS flow being added to the plurality of mapped QoS flows.

9. A method of wireless communication performed by a network node, comprising:
   selecting, based on a rule applied to a plurality of quality of service (QoS) flows mapped to a common data radio bearer (DRB), a channel access priority class (CAPC) for a user equipment (UE) to implement for a response data packet;
   transmitting the selected CAPC;
   transmitting a plurality of data packets via the common DRB, the common DRB comprising the plurality of QoS flows; and
   receiving the response data packet on the common DRB having the selected CAPC.

10. The method of claim 9, wherein the selecting further comprises:
   determining the selected CAPC for the common DRB per a logical channel (LCH) corresponding to each DRB.

11. The method of claim 10, wherein:
   the plurality of QoS flows are mapped to the common DRB based on a plurality of CAPCs corresponding to the plurality of QoS flows being the same among the plurality of QoS flows, and
   the selecting the CAPC for the common DRB is based on the same CAPC.

12. The method of claim 10, wherein:
   a first CAPC from among a plurality of CAPCs corresponding to the plurality of QoS flows comprises a lower access priority than a second CAPC from among the plurality of CAPCs, and
   the selecting the CAPC comprises selecting the first CAPC based on the first CAPC comprising the lower access priority.

13. The method of claim 10, wherein:
   a first CAPC from among a plurality of CAPCs corresponding to the plurality of QoS flows comprises a higher access priority than a second CAPC from among the plurality of CAPCs, and
   the selecting the CAPC comprises selecting the first CAPC based on the first CAPC comprising the higher access priority.

14. The method of claim 10, wherein the selecting further comprises:
   selecting the selected CAPC based on a QoS flow from a subset of QoS flows, the subset of QoS flows being from among the plurality of QoS flows.

15. The method of claim 10, wherein the selected CAPC is based on a first subset of QoS flows from among the plurality of QoS flows being greater than a second subset of QoS flows from among the plurality of QoS flows, wherein the first subset of QoS flows has a first common CAPC and the second subset of QoS flows has a second common CAPC different from the first common CAPC.

16. An apparatus for wireless communication, comprising:
   a transceiver configured to receive a plurality of data packets via a common data radio bearer (DRB), the common DRB comprising a plurality of mapped quality of service flows (QoS flows); and
   a processor configured to implement a channel access priority class (CAPC) for the common DRB to transmit a response data packet based on a rule applied to the plurality of mapped QoS,
   wherein the transceiver is further configured to transmit the response data packet with the implemented CAPC.

17. The apparatus of claim 16, wherein the transceiver is further configured to receive the CAPC for the common DRB, the CAPC determined by a separate wireless communications device per a logical channel (LCH) corresponding to each DRB.

18. The apparatus of claim 17, wherein the plurality of mapped QoS flows are mapped to the common DRB based on a corresponding plurality of CAPCs being the same among the plurality of mapped QoS flows, the rule comprising implementing the CAPC for the common DRB based on the same CAPC.

19. The apparatus of claim 17, wherein a first CAPC from among a plurality of CAPCs corresponding to the plurality of mapped QoS flows comprises a lower access priority than a second CAPC from among the plurality of CAPCs, the rule comprising implementing the first CAPC based on the first CAPC comprising the lower access priority.

20. The apparatus of claim 17, wherein a first CAPC from among a plurality of CAPCs corresponding to the plurality of mapped QoS flows comprises a higher access priority than a second CAPC from among the plurality of CAPCs, the rule comprising implementing the first CAPC based on the first CAPC comprising the higher access priority.

21. The apparatus of claim 17, wherein the rule comprises implementing the CAPC based on a QoS flow from a subset of QoS flows, the subset of QoS flows being from among the plurality of mapped QoS flows.

22. The apparatus of claim 17, wherein the rule comprises implementing the CAPC based on a first common CAPC identified from a first subset of QoS flows from among the plurality of mapped QoS flows, the first subset of QoS flows being greater than a second subset of QoS flows having a second common CAPC different from the first common CAPC.

23. The apparatus of claim 17, wherein the transceiver is further configured to:
   receive an updated to the implemented CAPC in response to a new QoS flow being added to the plurality of mapped QoS flows.

24. An apparatus for wireless communication, comprising:
   a processor configured to select, based on a rule applied to a plurality of quality of service (QoS) flows mapped to a common data radio bearer (DRB), a channel access priority class (CAPC) for a user equipment (UE) to implement for a response data packet; and
   a transceiver configured to:
      transmit the selected CAPC;
      transmit a plurality of data packets via the common DRB, the common DRB comprising the plurality of QoS flows; and
      receive the response data packet on the common DRB having the selected CAPC.

25. The apparatus of claim 24, wherein the processor is further configured, for the selection, to:
   determine the selected CAPC for the common DRB per a logical channel (LCH) corresponding to each DRB.

26. The apparatus of claim 25, wherein:
   the plurality of QoS flows are mapped to the common DRB based on a corresponding plurality of CAPCs corresponding to the plurality of QoS flows being the same among the plurality of QoS flows, and
   the processor is configured to select the CAPC for the common DRB based on the same CAPC.

27. The apparatus of claim 25, wherein:
   a first CAPC from among a plurality of CAPCs corresponding to the plurality of QoS flows comprises a lower access priority than a second CAPC from among the plurality of CAPCs, and
   the processor is configured to select the first CAPC based on the first CAPC comprising the lower access priority.

28. The apparatus of claim 25, wherein:
   a first CAPC from among a plurality of CAPCs corresponding to the plurality of QoS flows comprises a higher access priority than a second CAPC from among the plurality of CAPCs, and
   the transceiver is further configured to select the first CAPC based on the first CAPC comprising the higher access priority.

29. The apparatus of claim 25, wherein the processor is further configured to:
   select the CAPC based on a QoS flow from a subset of QoS flows, the subset of QoS flows being from among the plurality of QoS flows.

30. The apparatus of claim 25, where the selected CAPC is based on a first subset of QoS flows from among the plurality of QoS flows being greater than a second subset of QoS flows from among the plurality of QoS flows, wherein the first subset of QoS flows has a first common CAPC and the second subset of QoS flows has a second common CAPC different from the first common CAPC.

\* \* \* \* \*